Inventors
Joseph H. Brant
Benjamin Thompson

Patented May 26, 1942

2,283,911

UNITED STATES PATENT OFFICE 2,283,911

METHOD FOR TREATING UNSATURATED KETONES CONTAINING ALDEHYDE

Joseph H. Brant and Benjamin Thompson, Kingsport, Tenn., assignors to Eastman Kodak Company, Rochester, N. Y., a corporation of New Jersey Application September 7, 1939, Serial No. 293,784

8 Claims. (Cl. 202—67)

This invention relates to processes for refining and purifying aliphatic or aromatic ketones, α-substituted acroleins, higher aliphatic aldehydes, and the like, containing certain undesired constituents. More particularly, this invention relates to a method of treating crude unsaturated compounds such as methyl isopropenyl ketone, or α-substituted acroleins to eliminate therefrom formaldehyde, methyl ethyl ketone, or other saturated compounds.

The catalytic vapor phase reaction of a saturated ketone exemplified by methyl ethyl ketone reacted with formaldehyde produces the unsaturated ketone, methyl isopropenyl ketone, or the reaction, under certain conditions, of certain aldehydes produces α-substituted acroleins. Dependent upon quantities of reactants and other factors, the unsaturated compounds produced may also contain varying quantities of formaldehyde, saturated ketones or aldehydes higher than formaldehyde and water. The quantity of aldehyde such as formaldehyde appearing in the reaction product may be minimized by employing an excess of the saturated ketone, or higher aldehyde, in the reaction. In some instances, it is desired to obtain the unsaturated compound in a relatively pure condition substantially free of formaldehyde, saturated ketone, or higher aldehyde.

We have found procedure whereby mixtures containing the desired unsaturated compound in the presence of other materials such as formaldehyde, saturated ketones, and higher aldehydes may be treated in order to eliminate the undesired constituents. Furthermore, in considering our novel process, it should be kept in mind that although formaldehyde is a gas boiling at —21° C., we have developed improved procedure for handling this compound as will be set forth in detail hereinafter.

This invention has for one object to provide a method for refining and purifying compounds, from the group consisting of α-substituted acroleins and higher aliphatic aldehydes, aliphatic or aromatic and vinyl ketones. Still another object is to provide a method for the effective elimination of formaldehyde from crude mixtures of the aforementioned compounds containing this constituent. Still another object is to provide a method particularly adapted for separating formaldehyde and methyl ethyl ketone from methyl isopropenyl ketone containing these constituents. Another object is to provide a method particularly adapted for separating formaldehyde and other aldehydes from acroleins containing these constituents. A still further object is to provide a process in which the crude unsaturated product may be supplied to the process either in the gaseous or liquid phase. Other objects will appear hereinafter.

We have found that mixtures comprising compounds such as acroleins, aliphatic and aromatic ketones, vinyl ketone and other constituents such as saturated ketones, saturated aldehydes, formaldehyde and water, may be treated with a solvent for the formaldehyde, together with other procedure including distillation, to separate the compounds from the aldehyde and also to separate the compounds from each other. Our process may be operated at reduced pressure if desired. However, generally we operate our processes at atmospheric pressures or higher because of the gaseous nature of formaldehyde, as already pointed out.

For a more complete understanding of our invention, reference is made to the attached drawing forming a part of the present application.

Figure 1:
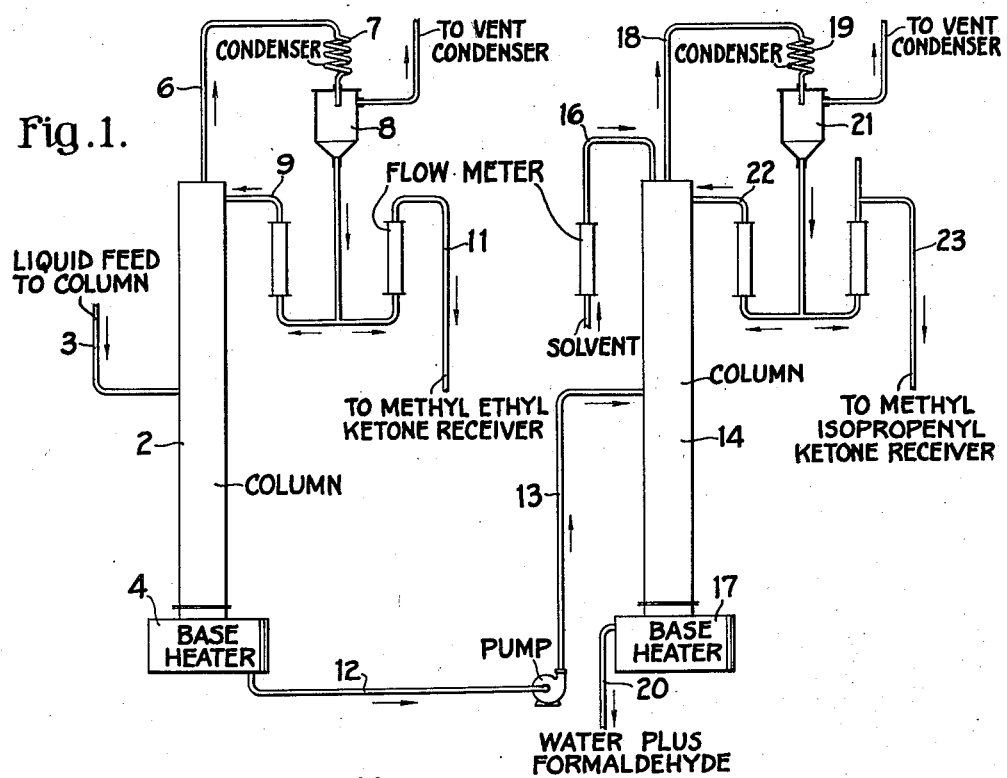
Fig. 1 is a side elevation view in the nature of a flow sheet showing suitable arrangement of apparatus for carrying out one embodiment of our process.
Figure 2:
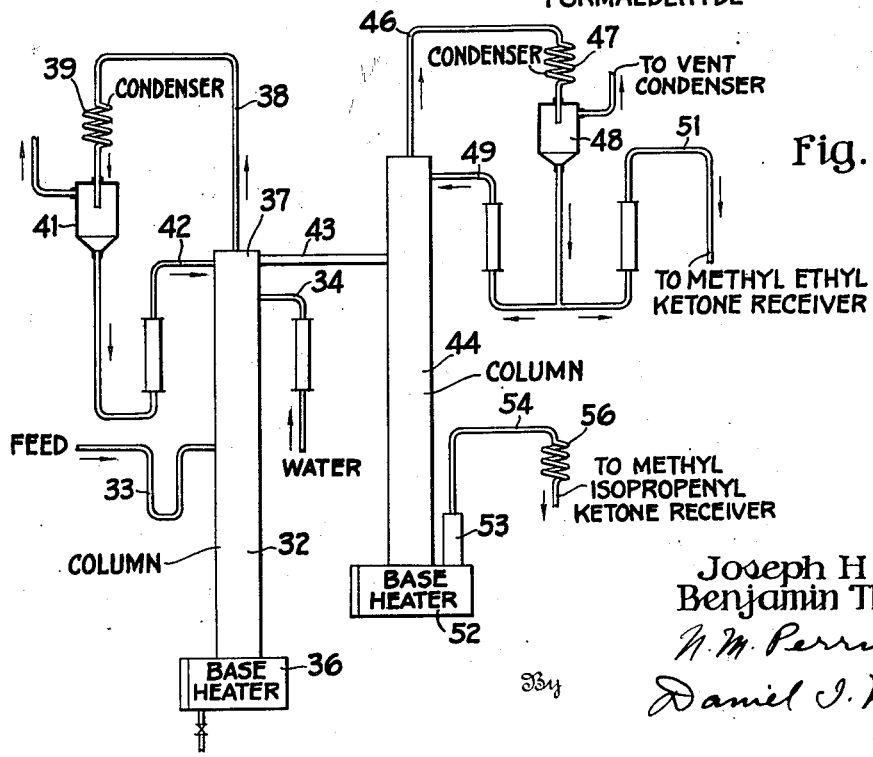
Fig. 2 is a side elevation view also in the nature of a flow sheet, showing another arrangement for carrying out our process.

The construction of the apparatus is largely apparent from the legends appearing on the drawing. However, further disclosure with respect thereto will be set forth as the description proceeds. In the drawing the treatment of mixtures comprising the unsaturated compound, methyl isopropenyl ketone, formaldehyde, saturated ketone, and water have been indicated for illustrating our preferred embodiment. However, our invention may be applied to other mixtures.

Referring now to our process applied to the treatment of ketone-containing mixtures, both arrangements use a common method of separation of formaldehyde from the ketone. We have found that if a solvent for the formaldehyde is fed into the upper portion of a column, no aldehyde will be found in the product leaving the column. In each case the aldehyde will be found in the base heater of the respective column. The amount of solvent added to the top of the column is determined by the amount of formaldehyde in the reaction mixture being treated. We have found in most instances that the amount of solvent need not exceed 10–15% by volume of the liquid mixture being processed. When the formaldehyde to be removed is low, amounts of a solvent, such as water, as low as 2–5% in volume may suffice.

A further understanding of our invention will be apparent from our consideration of the following specific examples which are set forth primarily for the purposes of illustrating our preferred embodiment. Hence, it is to be understood that our invention is not to be unduly restricted by the specific agents and values set forth in these examples, inasmuch as our process may be applied to other mixtures as will be indicated hereinafter.

*Example I.*—Referring to Fig. 1, the crude materials to be treated may be fed either as a liquid or vapor to column 2 through conduit 3. In the example under description the mixture fed through 3 was essentially comprised of methyl isopropenyl ketone in the presence of unreacted methyl ethyl ketone, formaldehyde, and some water. Heat was supplied to the base heater 4 of column 2. The crude mixture in column 2 was rectified and the methyl ethyl ketone component volatilized through the vapor offtake conduit 6 to condenser 7 into a receiver 8 for the condensate. A part of the methyl ethyl ketone condensate was returned to column 2 as reflux through reflux line 9. Another portion of the condensed methyl ethyl ketone was withdrawn through conduit 11 to the methyl ethyl ketone receiver (not shown).

The formaldehyde and methyl isopropenyl ketone concentrated with some water in the base heater 4 of column 2. A portion of this residue may be pumped through conduits 12 and 13 to the second column 14. It is, of course, understood that these columns might be so positioned that the contents of column 2 would flow by gravity to column 14. Column 14, as column 2, may comprise a bubble plate column, packed column or other conventional type.

The upper portion of column 14 is fed with a solvent for formaldehyde. For example, water may be introduced through conduit 16. The constant addition of water through the upper portion of column 14 causes the formaldehyde to remain well down in the column. Without this addition of water (or other solvent for the formaldehyde) the formaldehyde would distill with the ketone in a ratio nearly dependent upon the amount originally present in the feed to the column through conduit 13.

However, by means of the substantially constant addition of solvent as in accordance with our procedure, the formaldehyde is prevented from passing out of the top of the column and satisfactory separation is obtained. The formaldehyde-water mixture may be withdrawn from the base heater 17 through conduit 20 to dehydration or other treatment for the recovery and/or utilization of the aldehyde.

The methyl isopropenyl ketone vapors withdrawn through the vapor offtake conduit 18 are condensed in condenser 19 and pass into receiver 21. A portion of the condensate is returned as reflux through conduit 22 and another portion withdrawn through conduit 23.

*Example II.*—In accordance with this example, a crude mixture of unsaturated ketone, saturated ketone and aldehyde was fed into column 32 through conduit 33. The materials may be supplied to the column either in the liquid or vapor state. The mixture in this instance comprised the reaction product resulting from the vapor phase reaction of a saturated ketone and formaldehyde reacted at temperatures above 200° C. in the presence of a dehydration catalyst. In accordance with this example, the reaction mixture in column 32 was treated with the solvent, water, supplied to the upper portion of column 32 through conduit 34. The aldehyde in the reaction mixture descended to the base heater 36 and may be withdrawn to dehydration or other treatment and/or utilization. As in Example I, the addition of the formaldehyde solvent produced complete separation of the formaldehyde. In this example the source of formaldehyde present was "Formalin" and substantially complete separation was obtained.

During this treatment heat was supplied to the base heater 36 and a mixed ketone azeotrope vaporized to the head of the column 37. This azeotrope comprised the unsaturated ketone, methyl isopropenyl ketone, and the saturated ketone, methyl ethyl ketone. A portion of the ketone mixture was withdrawn through conduit 38, through condenser 39 to receiver 41. This condensate was returned through conduit 42 as reflux for column 32.

Another portion of the vapors comprising the ketone mixture was conducted through conduit 43 into a column 44. In column 44 the ketone mixture is rectified and the saturated ketone, methyl ethyl ketone, is withdrawn through conduit 46 through condenser 47 to receiver 48. A portion of the condensate from 48 is returned to column 44 through the reflux line 49. Another portion of the methyl ethyl ketone is withdrawn through conduit 51 to a receiver (not shown) from which it may be recirculated for the aforementioned catalytic vapor phase reaction.

The unsaturated ketone, methyl isopropenyl ketone, descends to the base heater 52 of column 44 and may be withdrawn in the liquid phase therefrom, depending upon the pressure and temperature conditions prevailing in the column. Or, if desired, the unsaturated ketone may be permitted to ascend the stub column 53 attached to base heater 52 and be withdrawn from the stub column through conduit 54 and condenser 56, to an unsaturated ketone receiver.

If the methyl isopropenyl ketone is desired in the anhydrous form, the ketone withdrawn from the stub column 53 may be decanted and the ketone layer dried by azeotropic distillation in another column.

In the operation of the aforementioned processes, it is to be understood that suitable flow meters, valves, thermometers and other parts and devices may be incorporated in the set-ups for assisting in the operation thereof. The various apparatus parts may be constructed of steel or other metals. However, we have found that where the unsaturated ketone contacts the apparatus in the liquid phase, a chromium-nickel steel which may contain small amounts of molybdenum, tungsten, copper, silicon and the like, is preferred. That is, for example, the portions of the apparatus comprising the liquid return lines, condensers, receivers and such other portions in which liquid accumulates, would preferably be constructed of a steel containing more than 12 or 15% chromium and more than 6%–8% nickel. The parts of the apparatus in contact with the vapors may also be constructed of such material but likewise may be constructed of lower alloy steels.

In accordance with our preferred manner of operation, the two columns described in each figure and example would be operated substantially continuously as one unit. However, instead of this preferred manner of operation, the two columns may be operated somewhat independently of one another if the mixed ketone azeotropes at the head of column 32 are completely condensed and then one portion used as reflux for column 32 and the remainder used as a liquid (rather than vapor feed) to column 44.

It therefore is apparent that we have provided a simple and efficient method of separating reaction mixtures comprising unsaturated ketones, saturated ketones, water and formaldehyde into components free of formaldehyde. The continuous addition of a formaldehyde solvent such as water to a point in the system above the introduction of the formaldehyde-containing mixture, permits the substantially complete separation of the formaldehyde. By our method either a wet or a dry unsaturated ketone, such as methyl isopropenyl ketone, free of formaldehyde may be obtained in a pure state.

As pointed out above, although we have described in detail the separation of a methyl isopropenyl ketone-methyl ethyl ketone-formaldehyde mixture for illustrating our invention, certain other mixtures may be separated in similar manner. For example, some of these other mixtures would be comprised as follows: methyl vinyl ketone—acetone—Formalin, α-isopropyl vinyl methyl ketone—methyl isobutyl ketone—Formalin.

Although our invention is particularly adapted for the separation of mixtures containing unsaturated ketones, it is desired to point out that our invention embraces other unsaturated compounds as for example mixtures of acroleins with formaldehyde and other aldehydes. In separating mixtures containing a compound such as α-ethyl acrolein, together with formaldehyde and another aldehyde, the mixture would be fed into the columns the same as described with respect to ketone-containing mixtures. The water may be introduced into either the first or second column as described, and separation of the formaldehyde will readily be obtained. In other words, when separating acrolein and formaldehyde containing mixtures, procedure will be the same excepting, of course, that due regard will be had for differences in boiling points. That is, if the acroleins being treated possess higher boiling points than the ketone mixture described, it is apparent that a higher temperature would be applied in the base heater to obtain distillation, or if desired, reduced pressure might be applied.

It therefore may be seen that our invention embraces the separation of mixtures containing one or more of the compounds α-substituted acroleins, higher aliphatic aldehydes, aliphatic, aromatic and vinyl ketones in admixture with formaldehyde. As indicated, our process is particularly applicable to the treatment of mixtures containing an unsaturated ketone such as methyl isopropenyl ketone or an unsaturated aldehyde such as α-ethyl acrolein in admixture with formaldehyde and also in admixture with another saturated aldehyde or ketone.

It is apparent from the foregoing, that our invention is susceptible of some modification; hence, we do not wish to be restricted, excepting insofar as may be necessitated by the prior art and the spirit of the appended claims.

What we claim and desire to be secured by Letters Patent of the United States is:

1. A process for separating a mixture of methyl ethyl ketone, methyl isopropenyl ketone and formaldehyde, which comprises feeding the mixture to a distillation column, subjecting the mixture to distillation for volatilizing the methyl ethyl ketone, condensing the volatilized methyl ethyl ketone and returning a part for reflux to the distillation, withdrawing a residue from the distillation comprising methyl isopropenyl ketone and formaldehyde, subjecting the residue to another distillation, injecting a solvent essentially comprised of water for the formaldehyde into this distillation so that it contacts and prevents the formaldehyde from being volatilized from the distillation, volatilizing methyl isopropenyl ketone from the distillation, condensing the volatilized ketone and returning a portion of the condensate for reflux and collecting the formaldehyde and solvent therefor as a residue of this further distillation.

2. A process for separating a mixture containing substantial amounts of a saturated ketone, a vinyl ketone and formaldehyde, which comprises supplying the mixture to a column, heating the mixture in the column and subjecting the heated mixture to contact with water, withdrawing ketone vapors from the column, condensing and returning at least a part of the condensate to the column for reflux, withdrawing another portion of the ketones from which the formaldehyde has been separated to another column, subjecting the ketones in this other column to further distillation to volatilize methyl ethyl ketone and obtaining residue of methyl isopropenyl ketone from said distillation.

3. The process of obtaining relatively pure methyl isopropenyl ketone from a mixture containing substantial amounts of methyl ethyl ketone, said methyl isopropenyl ketone and formaldehyde, and water, which comprises subjecting the components of the mixture to a plurality of distillations and during at least one of said distillations treating the components undergoing that distillation with a quantity of water so that water passes countercurrent to the formaldehyde vapors for repressing the formaldehyde, thereby permitting the separation from the formaldehyde of at least one of the ketones, obtaining an aqueous mixture of the methyl isopropenyl ketone, subjecting the aqueous mixture to decantation to obtain a water layer and a methyl isopropenyl ketone layer and withdrawing the methyl isopropenyl ketone layer from the decantation.

4. In a process for separating mixtures containing as essential ingredients at least one of the components acroleins, aliphatic aldehydes, aliphatic, aromatic and vinyl ketones, in admixture with formaldehyde, the steps which comprise subjecting the mixture to a plurality of distillations and during at least one of said distillations treating the components with water countercurrently introduced in the amount of about 10–15% by volume of the volume of the components undergoing that distillation.

5. In a process for separating mixtures containing as essential ingredients at least one ketone from the group consisting of aliphatic and aromatic vinyl ketones in admixture with formaldehyde, the steps which comprise subjecting components of the mixture to a plurality of distillations during at least one of said distillations treating at least some of the components with water in an amount between 2%–15% by volume of the volume of the component undergoing that distillation.

6. In a process for the separation of mixtures containing as essential ingredients at least one α-substituted acrolein in admixture with formaldehyde, the steps which comprise subjecting components of the mixture to a plurality of distillations and during at least one of said distillations treating the components undergoing the distillation with water countercurrently introduced in an amount between 2%–15% by volume.

7. A process for separating a mixture containing substantial amounts of a saturated oxygen-containing compound from the group consisting of ketones and aldehydes, an unsaturated oxygen-containing compound from the group consisting of ketones and aldehydes and formaldehyde which comprises subjecting the mixture to distillation wherein the saturated compound is obtained as one component and the unsaturated compound and formaldehyde are obtained as another component, subjecting the latter component to further distillation and during this further distillation contacting the mixture with a solvent for the formaldehyde essentially comprised of water which prevents it from distilling with the unsaturated compound, obtaining the formaldehyde and water as a residue of the distillation and obtaining the unsaturated compound as the head product of the distillation.

8. In a process for separating mixtures containing as essential ingredients at least one of the components acroleins, aliphatic aldehydes, aliphatic, aromatic and vinyl ketones, in admixture with formaldehyde, the steps which comprise subjecting the mixture to a plurality of distillations and during at least one of said distillations treating the components with water introduced counter-currently whereby formaldehyde is extracted therein.

JOSEPH H. BRANT.
BENJAMIN THOMPSON.